G. G. O'CONNOR.
ADJUSTABLE HANDLE FOR TOOLS.
APPLICATION FILED SEPT. 28, 1920.
1,413,869.
Patented Apr. 25, 1922.
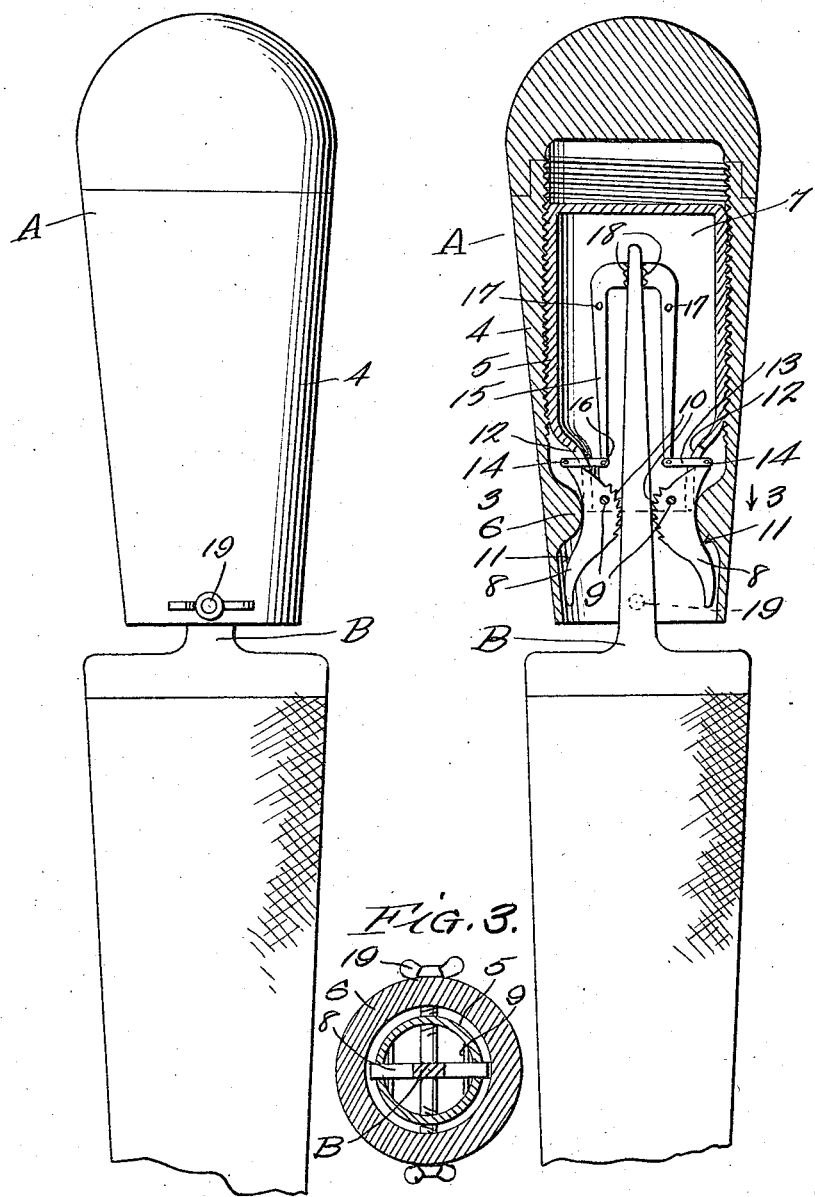
Inventor
Gerald G. O'Connor

UNITED STATES PATENT OFFICE.

GERALD G. O'CONNOR, OF PITTSBURGH, PENNSYLVANIA.

ADJUSTABLE HANDLE FOR TOOLS.

1,413,869.

Specification of Letters Patent. Patented Apr. 25, 1922.

Application filed September 28, 1920. Serial No. 413,415.

*To all whom it may concern:*

Be it known that I, GERALD G. O'CONNOR, a citizen of the United States, residing at Pittsburgh, in the county of Allegheny and State of Pennsylvania, have invented certain new and useful Improvements in an Adjustable Handle for Tools, of which the following is a specification.

My invention relates to a handle for tools, particularly those having long tapered handle-receiving shanks like files, screw drivers, and soldering irons.

The invention aims to provide a novel construction of handle which may be interchangeably used on many tools and at the same time have means to securely grip the shank and effect a fastening relation.

I also aim to provide a construction utilizing pivoted shank-gripping members, a rotatable handle and means to permit adjustment of the handle to move the gripping members.

In addition, I aim to provide the details of construction, arrangements and combinations of the parts set forth in the present preferred form illustrated in accompanying drawings.

From the following detailed description taken in connection with said drawings, additional objects and advantages will appear.

In said drawings,

Figure 1 is an elevation of the handle applied to a fragmentary tool;

Figure 2 is a vertical section through the handle showing it applied to a tool; and Figure 3 is a cross-section taken on the line 3—3 of Figure 2.

Referring specifically to the drawings, the handle involving my improved construction is illustrated at A and may be used for any tool having a handle-receiving shank such as B of the tool fragmentarily shown. This shank B is preferably long and relatively narrow and thick.

In carrying out the invention, a hollow section 4 of suitable design and material, for instance wood or metal is provided, preferably having interior screw threads at 5 and an annular lobe or cam 6. Within the section 4 is a hollow metallic drum 7 provided with screw threads in engagement with those at 5.

A plurality of gripping pawls or dogs 8 are preferably employed, being pivoted to the section 7 at 9, provided with serrations or teeth 10 to engage or grip shank B, and being of any desired configuration, but preferably having curved back walls or edges 11 so that the lobe 6 will extend thereinto and regardless of the direction of sliding movement of the handle section 4, will tilt the dogs.

Dogs 8 work in slots 12 of the section 7 and links 13 pivoted to the dogs at 14 also work therein. Links 13 are pivoted to levers 15 at 16. In turn, levers 15 are pivoted at 17 to the section 7. Levers 15 terminate in gripping jaws 18 preferably serrated or toothed to engage the shank B.

In order to steady the tool, set screws 19 may be mounted in the section A to be adjusted into and out of engagement with opposite sides of the shank B. It will be noted that the screws 19 are disposed in a line at right angles to the plane of movement of the dogs 8.

In use, the shank B of the tool is inserted into sections A and 7, passing intermediate the dogs 8 and jaws 18 so that the teeth thereof will grip or bite the shank. Section A is then turned, moving relatively to the section 7 and on the screw threads at 5, resulting in the cam 6 forcing the dogs into still tighter engagement with the shank B. While the jaws 18 serve to grip the shank in addition to the dogs, yet the primary function thereof is to retain and steady the free end of the shank. After attachment in this manner has been made, the screws 19 may be moved into binding relation with the shank to further steady the handle. In detaching the handle, it will be realized that the section A is turned in a reverse direction, with the cam moving against the curved walls of the dogs to retract the teeth of the dogs and jaws to release the shank and permit ready withdrawal of the tool.

As merely one preferred embodiment has been illustrated and described, it is to be understood that changes in the details may be made within the spirit and scope of the appended claims.

I claim:—

1. A holder having a tool-gripping member, a hood mounting said member and held against rotation upon its engaging an object, means movable longitudinally of the hood to operate the said member, and a tool-steadying member operated through movement of the gripping member.

2. A holder having a tool-gripping member, a hood mounting said member and held against rotation upon its engaging an object, means movable longitudinally of the hood to operate the said member, a tool-steadying member operated through movement of the gripping member comprising a lever to engage the tool, and a link connected to the gripping member and lever.

3. A holder having a drum provided with external screw threads, and with slots, dogs pivoted on the drum to move in said slots to engage the tool to hold the drum against turning, levers to steady the tool carried by the drum, means to operatively connect the dogs and levers, a handle section having screw threads engaging said screw threads on the drum and having a cam, and said dogs being recessed to receive said cam to tilt them by movement in either direction.

In testimony whereof, I have affixed my signature in the presence of two witnesses.

GERALD G. O'CONNOR.

Witnesses:
WILLIAM J. DUNN,
CHARLES L. GAY.